(12) United States Patent
Wang (10) Patent No.: US 11,238,003 B2
(45) Date of Patent: *Feb. 1, 2022

(54) INTERFACE CLOCK MANAGEMENT

(71) Applicant: Rambus Inc., Sunnyvale, CA (US)

(72) Inventor: Yuanlong Wang, San Jose, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,839

(22) Filed: Jan. 6, 2020

(65) Prior Publication Data

US 2020/0218686 A1 Jul. 9, 2020

Related U.S. Application Data

(63) Continuation of application No. 15/794,148, filed on Oct. 26, 2017, now Pat. No. 10,558,608, which is a continuation of application No. 13/503,702, filed as application No. PCT/US2010/054762 on Oct. 29, 2010, now Pat. No. 9,824,056.

(60) Provisional application No. 61/258,441, filed on Nov. 5, 2009.

(51) Int. Cl.
*G06F 1/00* (2006.01)
*G06F 13/42* (2006.01)
*G06F 1/3237* (2019.01)
*G06F 1/3206* (2019.01)
*G06F 1/3234* (2019.01)

(52) U.S. Cl.
CPC ........ *G06F 13/4243* (2013.01); *G06F 1/3206* (2013.01); *G06F 1/3237* (2013.01); *G06F 1/3275* (2013.01); *Y02B 70/10* (2013.01); *Y02D 10/00* (2018.01); *Y02D 30/50* (2020.08)

(58) Field of Classification Search
CPC ..... G11C 7/1072; G11C 7/22; G06F 13/4243; G06F 1/3203; G06F 13/1694; G06F 1/3237
See application file for complete search history.

(56) References Cited

U.S. PATENT DOCUMENTS

| | | | |
|---|---|---|---|
| 6,337,833 B1 | 1/2002 | Kanazashi et al. | |
| 6,434,654 B1 | 8/2002 | Story et al. | |
| 6,583,946 B1 | 6/2003 | Emerson | |
| 6,678,832 B1 | 1/2004 | Gotanda | |
| 6,775,328 B1 | 8/2004 | Segaram | |
| 7,292,500 B2 | 11/2007 | Liu et al. | |
| 7,523,282 B1 | 4/2009 | Kapil et al. | |
| 2003/0034839 A1 | 2/2003 | Poggi et al. | |
| 2003/0046599 A1* | 3/2003 | Takamiya | G06F 1/3203 713/600 |

(Continued)

*Primary Examiner* — Zhipeng Wang
(74) *Attorney, Agent, or Firm* — The Neudeck Law Firm, LLC (57) ABSTRACT

The timing of the synchronous interface is controlled by a clock signal driven by a controller. The clock is toggled in order to send a command to a memory device via the interface. If there are no additional commands to be sent via the interface, the controller suspends the clock signal. When the memory device is ready, the memory device drives a signal back to the controller. The timing of this signal is not dependent upon the clock signal. Receipt of this signal by the controller indicates that the memory device is ready and the clock signal should be resumed so that a status of the command can be returned via the interface, or another command issued via the interface.

20 Claims, 10 Drawing Sheets

(56) References Cited

U.S. PATENT DOCUMENTS

| | | |
|---|---|---|
| 2004/0006654 A1 | 1/2004 | Bando |
| 2004/0043734 A1 | 3/2004 | Hashidate |
| 2006/0018165 A1 | 1/2006 | Szczypinski |
| 2006/0095699 A1 | 5/2006 | Kobayashi et al. |
| 2006/0119435 A1 | 6/2006 | Oh et al. |
| 2006/0280485 A1 | 12/2006 | Kubohara et al. |
| 2007/0106859 A1* | 5/2007 | Oshikiri .............. G06F 13/4243 711/167 |
| 2007/0156995 A1 | 7/2007 | Kaburlasos |
| 2007/0217278 A1 | 9/2007 | Uchida |
| 2008/0046627 A1* | 2/2008 | Castro ................ G06F 13/4031 710/313 |
| 2008/0074933 A1 | 3/2008 | Louie et al. |
| 2008/0155287 A1 | 6/2008 | Sundaram et al. |
| 2008/0159188 A1 | 7/2008 | Funagai |
| 2009/0051576 A1 | 2/2009 | Dedic et al. |
| 2009/0240839 A1 | 9/2009 | Yoneyama |
| 2010/0162053 A1 | 6/2010 | Gillingham |
| 2012/0132821 A1 | 5/2012 | Kuwabara |

\* cited by examiner

INTERFACE CLOCK MANAGEMENT

TECHNICAL FIELD

The present disclosure relates to techniques for communicating information between circuits. More specifically, but not exclusively, the present disclosure relates to communication protocols and signals between a memory controller and a memory device.

BACKGROUND

Semiconductor memory is an important part of modern electronics. Semiconductor memory may be divided into major categories. Two of these categories include volatile memory, which loses its content when power to the device is switched off, and nonvolatile memory, which retains its content when power to the device is switched off. Like other silicon technology, nonvolatile memory has been growing in density and performance. This growth in density and performance has generally followed Moore's law.

A further subcategory of nonvolatile memory is called flash memory. Flash memory can typically be electrically erased and reprogrammed without being removed and placed in a special programming device. The growth of battery powered electronics such as mobile phones, digital cameras, personal digital assistants (PDAs), and MP3 players has fueled demand for flash memory. Flash memory may be used to store such information as firmware, identification and security codes, trimming of analog functions, system parameters, and user programmable options. Thus, flash memory devices are now included in virtually all modern electronic devices.

DETAILED DESCRIPTION

In an embodiment, a controller and a memory device are coupled via a synchronous interface to exchange commands (e.g., read, read activate, read column, program, erase, etc.) and data. The timing of the interface is controlled by a clock signal driven by the controller. The controller sends a command, to the memory device, via the interface. In an embodiment, the memory device samples the command synchronously with respect to the clock signal. If there are no additional commands to be sent via the interface, the controller may suspend the clock signal. When the memory device is ready (perhaps tens of microseconds later), the memory device drives a signal back to the controller. The timing of this signal is not dependent upon the clock signal. Receipt of this signal by the controller indicates that the memory device is ready (e.g., the command is complete or nearly complete) and the clock signal should be resumed so that a status of the command can be returned via the interface, or another command issued via the interface. The memory device then may also use the clock signal to output the data (e.g., in the case of the command being a read command) such that the data is output by the memory device synchronously with respect to the clock signal. Stopping the clock can save power.

In another embodiment, the controller and the memory device are coupled via two interfaces. One of these interfaces is a parallel interface used to communicate commands (a.k.a., transactions) to and from the memory device. The other is a serial interface used to communicate a status (e.g., ready/busy, pass/fail) of these transactions. The serial interface may be coupled to multiple memory devices in a daisy-chain or ring-topology fashion.

The timing of the parallel and serial interfaces is controlled by the clock signal from the controller. When there are no transactions to be communicated via the parallel interface, no status to be communicated via the serial interface, and the clock is not needed by the memory device for internal operations, the controller stops toggling the clock signal. When there is a transaction to be communicated, a status to be communicated, or the clock is now needed by the memory device, a signal is sent to the controller indicating the clock signal should be re-enabled. This signal may be an open-drain type signal so that multiple memory devices may request the controller to turn the clock signal back on using a single signal line. In response to this signal, the controller resumes toggling the clock signal.

Figure 1:
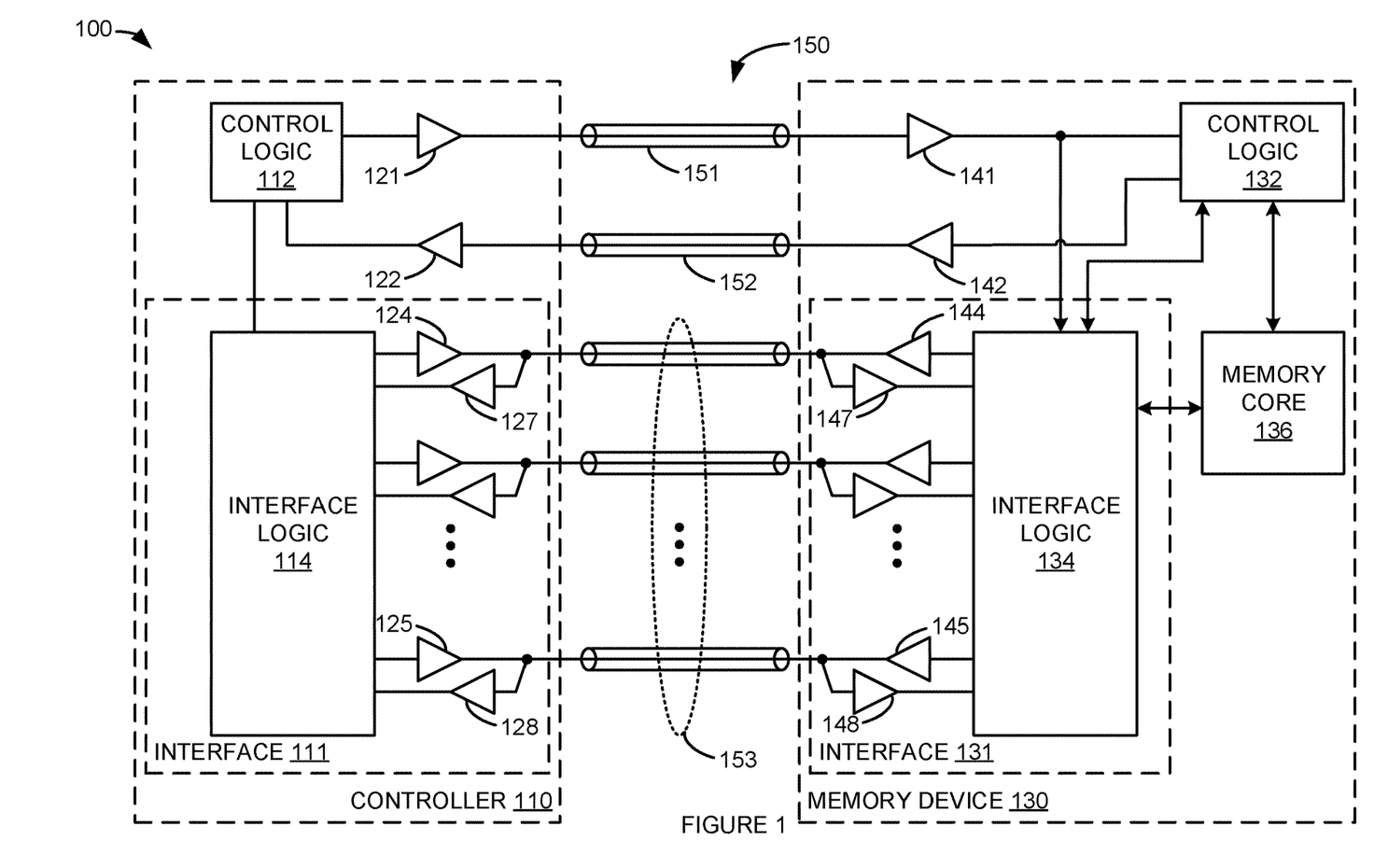
FIG. 1 is a block diagram illustrating a memory system with a controller and a memory device.

FIG. 1 is a block diagram illustrating a memory system with a controller and a memory device in accordance with an embodiment. In FIG. 1, memory system 100 comprises controller 110, memory device 130, and interconnect 150. Controller 110 and memory device 130 are integrated circuit type devices, such as one commonly referred to as a "chip". A memory controller, such as controller 110, manages the flow of data going to and from memory devices. A memory controller can be a separate, stand alone chip, or integrated into another chip. For example, a memory controller may be included on a single die with a microprocessor, or included as part of a more complex integrated circuit system such as a block of a system on a chip (SOC).

Controller 110 includes control logic 112, interface 111, clock driver 121, and resume signal receiver 122. Interface 111 includes interface logic 114, interface drivers 124-125, and interface receivers 127-128. Memory device 130 includes control logic 132, interface 131, memory core 136, clock receiver 141, and resume signal driver 142. Interface 131 includes interface logic 134, interface drivers 144-145, and interface receivers 147-148. Interconnect 150 includes clock signal line 151, resume signal line 152, and interface signal lines 153. Control logic 112 is operatively coupled to clock signal driver 121, resume signal receiver 122, and interface logic 114. Clock signal driver 121 is coupled to drive a clock signal onto clock signal line 151. Resume signal receiver 122 receives a resume signal from resume signal line 152. Interface drivers 124-125 and interface receivers 127-128 are coupled to interface logic 114. Interface drivers 124-125 and interface receivers 127-128 send and receive, respectively, signals carried by interface signal lines 153.

Control logic 132 is operatively coupled to clock signal receiver 141, resume signal driver 142, interface logic 134, and memory core 136. Clock signal receiver 141 is coupled to receive a clock signal from clock signal line 151. Clock signal receiver is coupled to send the received clock signal to control logic 132 and interface logic 134. Thus, the clock signal driven by controller 110 is operatively coupled to control logic 132 and interface logic 134.

Resume signal driver 142 is coupled to send a resume signal via resume signal line 152. A resume signal generated by control logic 132 may be received by control logic 112 via resume signal driver 142, resume signal line 152, and resume signal receiver 122. In response to the state of the resume signal received by control logic 112, control logic 112 may selectively enable and disable the toggling of the clock signal sent to memory device 130 (and thus control logic 132 and interface logic 134) via clock signal line 151.

Interface drivers 144-145 and interface receivers 147-148 are coupled to interface logic 134. Interface logic 134 is also coupled to control logic 132 and memory core 136. Interface drivers 144-145 and interface receivers 147-148 are coupled to send and receive, respectively, signals carried by interface signal lines 153.

In an embodiment, interface 111, under the control of control logic 112, outputs commands and data to memory device 130. This data may include data being sent to memory core 136 for storage. Likewise, under the control of control logic 132, interface 131 outputs responses to these commands and data to controller 110. This data may include information retrieved from memory core 136. Memory core 136 may be a nonvolatile or flash memory core.

The protocols for transferring commands and data via interfaces 111 and 131 may be specified according to, or compliant with a standard. For example, to facilitate NAND Flash integration into consumer electronic products, computing platforms, and any other application that requires solid state mass storage, the Open NAND Flash Interface industry working group have promulgated several specifications that define a standardized NAND Flash device interfaces. These specifications define standardized component-level interface specifications, connector, and module form factor specifications for NAND Flash. These standards are available at www.onfi.org. Likewise, a standard that details interfaces called Toggle-mode DDR NAND has been proposed to JEDEC for standardization.

Commands sent by controller 110 to memory device 130 may include the following functions: read, read activate, read column, read status register, program, and erase. A command, or one or more indications of a result, status, or data, or a combination of these, may be referred to as a transaction.

The read function results in memory device 130 fetching a page from memory core 136 into on-chip page registers and returning the requested column data. The read activate function results in memory device 130 fetching a page from memory core 136 into on-chip page registers. The read column function results in memory device 130 returning the requested column data from the on-chip page registers to controller 110. The read status function results in a status being sent from memory device 130 to controller 110. The program function first results in memory device 130 setting itself up to be programmed. Then, data sent to memory device 130 by controller 110 is written to an addressed location in memory core 136. The erase function performs an erase of an addressed sector.

Commands sent by controller 110 to memory device 130 may take different amounts of time for control logic 132 to complete. In addition, the amount of time a particular command takes to be executed by the memory device 130 may vary each time that command is issued to the memory device. For example, data to be written into memory core 136 is typically applied to memory core 136 along with the appropriate control signals and programming voltages. Memory core 136 is then set to a program verify mode and the data just written is read back by control logic 132. If the read data does not match the written data, the write process may be repeated up to a maximum number of retries. Once the read data matches the write data, the program function may halt. Thus, the program function may take an unknown number of programming cycles to complete.

In an embodiment, controller 110 drives a clock signal to memory device 130 via clock signal line 151. Typically, this clock signal when driven, will toggle periodically at a predetermined frequency. Controller 110 also outputs a command to memory device 130 via interface 111. Memory device 130 may use the clock signal to sample the command from controller 110. After this command is output, controller 110 may cease to provide the clock signal. For example, if controller 110 has no additional commands to send to memory device 130, controller 110 may stop toggling the clock signal. In another example, controller 110 may cease to provide the clock based on a status or condition associated with the command. For example, controller 110 may stop providing the clock signal because it has associated a condition, such as a wait period or wait status, with the command.

After memory device 130 has processed the command sent by controller 110, or for some other reason needs the clock signal, memory device 130 drives a resume signal to controller 110 via resume signal line 152. Upon receiving the resume signal, controller 110 resumes driving the clock signal to memory device 130. This allows controller 110 and memory device 130 to communicate via interface 111 and interface 131, respectively. This communication may be based on timing associated with (or synchronized by) the clock signal. Memory device 130 may return an indicator of status associated with the command via interface signal lines 153. In an example, after controller 110 resumes driving the clock, controller 110 or memory device 130 may output additional data or commands to interface signal lines 153. Examples of additional data that may be output includes portions of burst-mode or page-mode access data.

In an embodiment, memory device 130 may receive the command from controller 110 asynchronously or timed by a signal other that clock signal line 151. In this case, the resume signal driven by memory device 130 may indicate that controller 110 is to provide a clock or strobe signal to time a data transfer from memory device 130 to controller 110. This strobe signal may be used instead of, or in combination with, the resumed clock signal on clock signal line 151. For example, the clock signal on clock signal line 151 may be used to synchronize the sending of commands by the controller and a strobe signal, sent on another signal line (not shown) by the controller may be used as a timing reference for the transfer of data. A strobe signal, in an embodiment, is a source synchronous signal that travels alongside the data as it propagates between the controller and memory device and is used by the receiver to capture the data. The start and end of the toggling of the strobe may indicate the start and end of the data transfer. A strobe signal may also have a preamble to indicate the start of the data burst.

Memory device 130 receives the clock signal on clock signal line 151 via receiver 141. In an embodiment, memory device 130 receives the command sent by controller 110 synchronously with respect to the clock signal. In other words, receivers 147-148 of interface 131 may sample signals present on interface signal lines, based on timing associated with the clock signal received on clock signal line 151. A command received by memory device 130 may be a read command that specifies an access to data stored by memory core 136. After sending the read command to memory device 130, controller 110 may stop sending the clock signal.

A delay time period may elapse while memory device 130 processes the read command and accesses the requested data from memory core 136. During this delay time period, memory device 130 may be operated according to internally generated timing signals. Once a command is started, these internally generated timing signals are not dependent upon a received clock signal. The clock signal received via clock signal line 151 may only be necessary for synchronizing high speed transfers on the interface(s) between controller 110 and memory device 130.

After a delay time period has elapsed, memory device 130 may drive the resume signal to controller 110. Memory device 130 may drive the resume signal before the requested data is ready to be output. Typically, memory device 130 will be driving the clock resume signal when the clock signal is not toggling. Once both the clock signal is resumed, and the accessed data is ready to be output, memory device 130 outputs the accessed data using drivers 144-145. The accessed data may be output by drivers 144-145 based on timing associated with the transitions of the clock signal (i.e., output drivers 144-145 output the data synchronously with respect to the clock signal).

Figure 2:
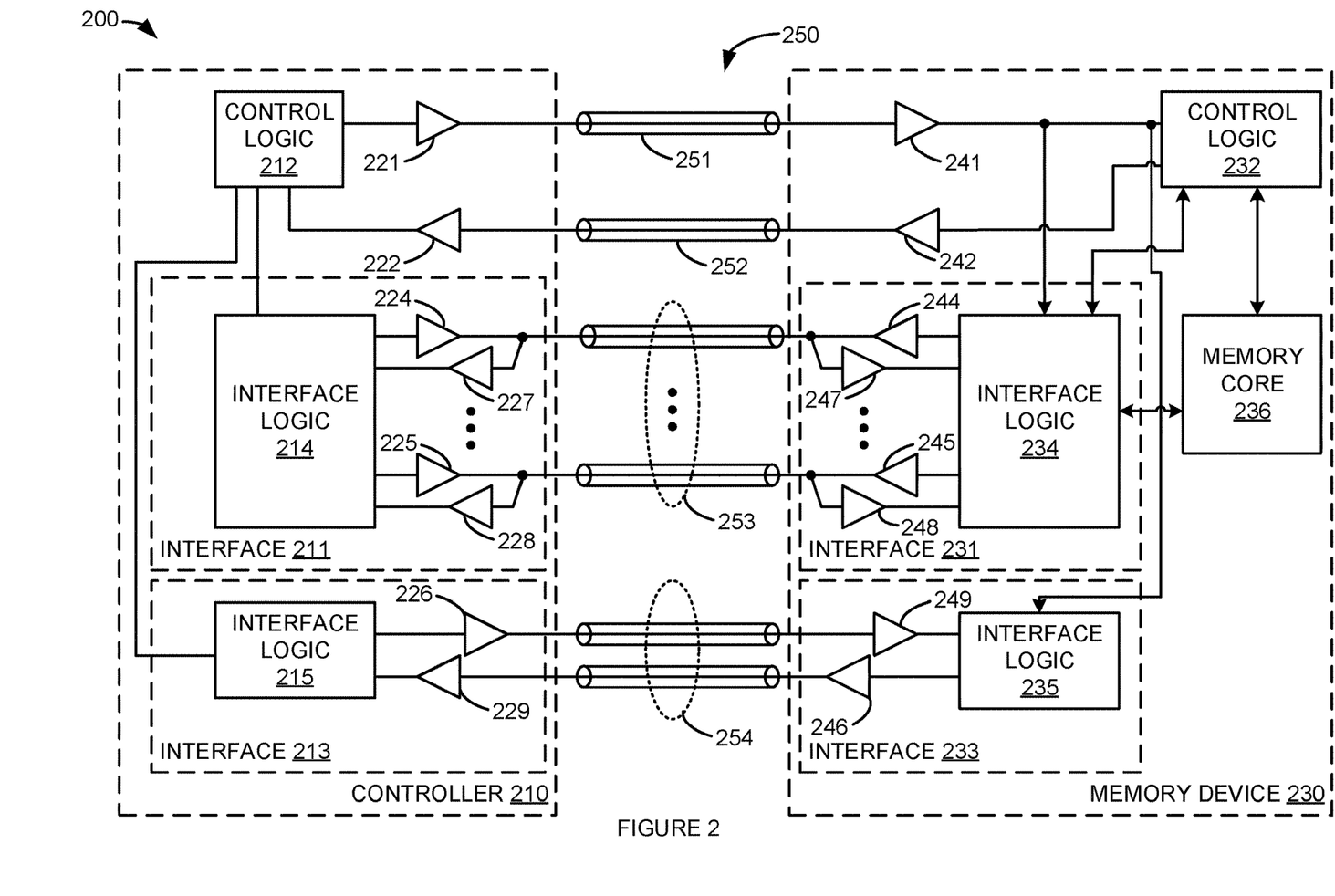
FIG. 2 is a block diagram illustrating a memory system that includes a serial interface.

FIG. 2 is a block diagram illustrating a memory system that includes a serial interface. In FIG. 2, memory system 200 comprises controller 210, memory device 230, and interconnect 250. Controller 210 may be an integrated circuit. Memory device 230 may be an integrated circuit.

Controller 210 includes control logic 212 interface 211, clock driver 221, and resume signal receiver 222. Interface 211 includes interface logic 214, interface drivers 224-225, and interface receivers 227-228. Memory device 230 includes control logic 232, interface 231, memory core 236, clock receiver 241, and resume signal driver 242. Interface 231 includes interface logic 234, interface drivers 244-245, and interface receivers 247-248. Interconnect 250 includes clock signal line 251, resume signal line 252, and interface signal lines 253.

In FIG. 2, controller 210, control logic 212, interface 211 (and interface 211's components 214, 224-225, 227-228), clock driver 221, and resume signal receiver 222 are interconnected in FIG. 2 and perform much the same functions as described previously with respect to controller 110, control logic 112, interface 111 (and interface 111's components 114, 124-125, 127-128), clock driver 121, and resume signal receiver 122, respectively, in FIG. 1. Memory device 230, control logic 232, interface 231 (and interface 231's components 234, 244-245, 247-248), memory core 236, clock receiver 241, and resume signal driver 242 are interconnected in FIG. 2 and perform much of the same functions as described previously with respect to memory device 130, control logic 132, interface 131 (and interface 131's components 134, 144-145, 147-148), memory core 136, clock receiver 141, and resume signal driver 142, respectively, in FIG. 1. Interconnect 250, clock signal line 251, resume signal line 252, and interface signal lines 253 interconnect and carry corresponding signals between controller 210 and memory device 230 as interconnect 150, clock signal line 151, resume signal line 152, and interface signal lines 153, respectively, in FIG. 1.

In FIG. 2, however, controller 210 further includes interface 213. Memory device further includes interface 233. Interconnect 250 further includes interface signal lines 254. Thus, controller 210 and memory device 230 in FIG. 2 are connected by the additional interfaces 213 and 233 not shown with respect to controller 110 and memory device 130 in FIG. 1.

Interface 213 includes interface logic 215, serial driver 226, and serial receiver 229. Interface 233 includes interface logic 235, serial driver 246, and serial receiver 249. Serial driver 226 may drive a serial bit stream onto one of interface signal lines 254 to be received by serial receiver 249. Serial driver 246 may drive a serial bit stream onto one of interface signal lines 254 to be received by serial receiver 229.

Interface 213 of controller 210 and interface 233 of memory device 230 form a bidirectional interface for communicating between controller 210 and memory device 230. This bidirectional interface is in addition to, and may be independent from, a parallel interface formed by interfaces 211 and 231. Information may be communicated in a serial manner via interface signal lines 254 between controller 210 and memory device 230. This information may include transactions that assign an identification number to memory device 230; ready/busy/done status indicators associated with transactions, command, or processes; and, transaction pass/fail status indicators. In another embodiment, interfaces 213 and 233 of controller 210 and memory device 230, respectively, may have additional signal lines in order to communicate information in a parallel manner.

Similar to controller 110, controller 210 may drive a clock signal to memory device 230. This clock signal, when driven, typically has a nominally stable, predetermined frequency. Controller 210 may send commands or transactions via interface 211. Controller 210 may send commands or transactions via interface 213. These commands or transactions may be sampled using the clock signal. After a transaction is output, controller 210 may stop toggling the clock signal. Controller 210 may stop sending the clock signal when it has no additional commands to send. A status or condition associated with a command may also result in controller 210 stopping the clock signal. For example, controller 210 may stop the clock signal during a transaction condition, such as a waiting for a command to complete, or waiting for a response from memory device 230.

When memory device 230 needs the clock signal, memory device 230 may drive a resume signal via resume signal line 252. Controller 210 resumes driving the clock signal in response to receiving the resume signal. Once the clock signal is resumed, controller 210 and memory device 230 may communicate via interfaces 211 and 231, or via interfaces 213 and 233. These communications may be governed according to timing associated with the clock signal.

Memory device 230 may return an indicator of status associated with a command via serial interface signal lines 254. This indicator may be sent as a serial bit stream. The timing of the bits sent by memory device 230 may be governed by the resumed clock signal. Controller 210 or memory device 230 may send additional data or commands via either of interface signal lines 253 or 254. Examples of additional data that may be sent include serial data received from other memory devices (not shown), and portions of burst-mode or page-mode access data.

As discussed previously, memory device 230 may receive commands or data synchronously with respect to the clock signal. In other words, receivers 247-248 of interface 231 and/or receiver 249 of interface 249 may sample based on the timing of the clock signal. Likewise, drivers 244-246 may drive signals based on the timing of the clock signal.

Commands received by memory device 230 may include read or program commands. Read or program commands typically involve an access to memory core 236. While controller 210 waits for one or more commands to complete, controller 210 may stop sending the clock signal.

Memory device 230 may run a timer while it processes one or more commands, and accesses memory core 236. This timer may initiate an action by memory device 230 after a delay time period elapses. This action may include driving the resume signal. The delay time period may correspond to an anticipated completion time for a command being processed. The delay time period may be set such that once the resume signal is driven, and controller 210 responds by resuming the clock signal, the clock signal is being received by memory device 230 before the command completes. In this way, memory device 230 will be immediately ready to send a result, or data, to controller 210 via either of interface signal lines 253 or interface signal lines 254 when the command completes.

Figure 3:
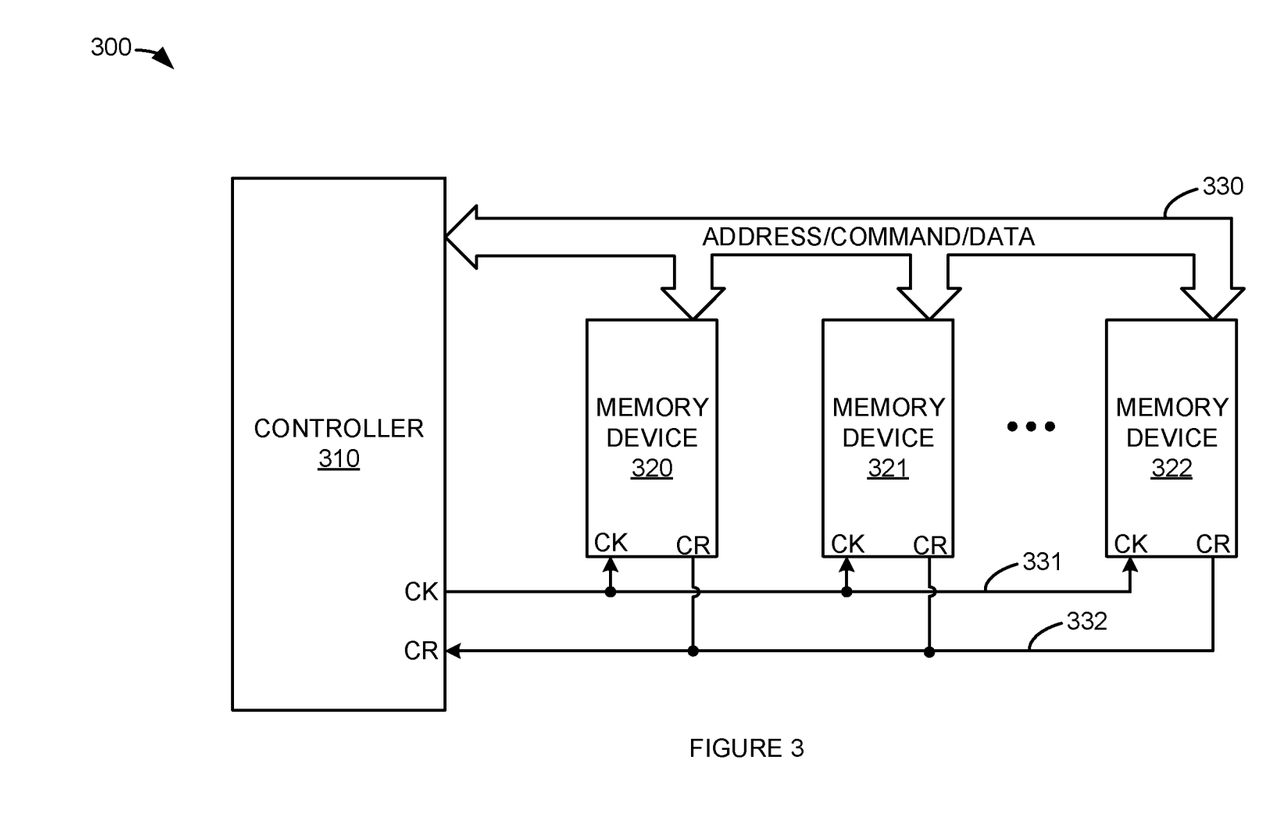
FIG. 3 is a block diagram illustrating a memory system with a controller and multiple memory devices.

FIG. 3 is a block diagram illustrating a memory system with a controller and multiple memory devices. Memory system 300 comprises controller 310, memory device 320, memory device 321 and memory device 322. Controller 310 may correspond to controller 110 or controller 210. Any of memory devices 320-322 may correspond to memory device 130. Controller 310 is coupled to each of memory devices 320-322 by a shared address/command/data bus 330. Address/command/data bus 330 may correspond to interface signal lines 153.

Controller 310 drives a clock signal via clock signal line 331 to a clock input of each of memory devices 320-322. This clock signal may correspond to the clock signal carried by clock signal line 151. Each memory device 320-322 may drive a resume signal via resume signal line 332 to controller 310. This resume signal may correspond to the resume signal carried by resume signal line 152. Since multiple memory devices 320-322 may drive resume signal 332, resume signal 332 may be configured as a "wired-OR" type signal connected in common to each memory device 320-322. A wired-OR signal line typically has a single passive pull-up device (e.g., termination resistor). Each memory device wishing to assert the line only pulling the signal line down (or to another predetermined logic level). Typically, this is done with open-drain or open-collector type output drivers. Thus, drive fights where one device is trying to pull a line to a high level while another device is trying to pull the line to a low level are avoided. This also results in the logical OR'ing of all of the outputs being asserted.

Figure 4:
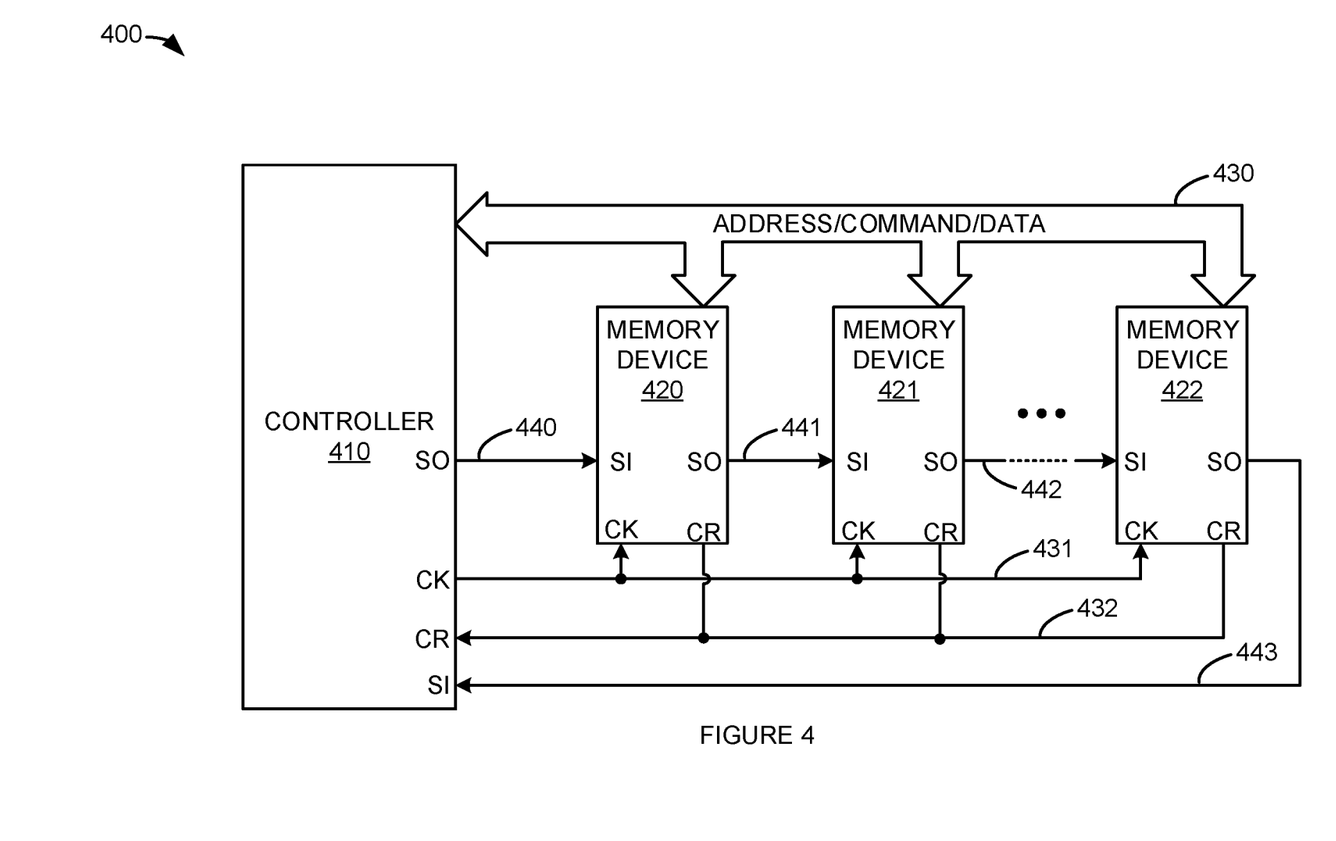
FIG. 4 is a block diagram illustrating a memory system with multiple memory devices that includes a serial interface connect in a ring topology.

FIG. 4 is a block diagram illustrating a memory system with multiple memory devices that includes a serial interface connected in a ring topology. Memory system 400 comprises controller 410, memory device 420, memory device 421 and memory device 422. Controller 410 may correspond to controller 210. Any of memory devices 420-422 may correspond to memory device 230. Controller 410 is coupled to each of memory devices 420-422 by a shared address/command/data bus 430. Address/command/data bus 430 may correspond to interface signal lines 253.

Controller 410 drives a clock signal via clock signal line 431 to a clock input of each of memory devices 420-422. This clock signal may correspond to the clock signal carried by clock signal line 251. Each memory device 420-422 may drive a resume signal via resume signal line 432 to controller 410. This resume signal may correspond to the resume signal carried by resume signal line 252. Since multiple memory devices 420-422 may drive resume signal 432, resume signal 432 may be configured as a wired-OR type signal.

Controller 410 also interfaces to memory devices 420-422 via a ring-topology serial interface. This serial interface may correspond to the signals carried by interface signal lines 254. The serial interface is comprised of serial signal lines 440-443. Serial signal line 440 is driven by a serial output (SO) of controller 410 and received by a serial input (SI) of memory device 420. Serial signal line 441 is driven by the SO output of memory device 420 and received by the SI input of memory device 421. Serial signal line 442 is driven by the SO output of memory device 421 and received by the SI input of memory device 422. Serial signal line 443 is driven by the SO output of memory device 422 and received by the SI input of controller 410. Thus, it can be seen that the SI inputs and SO outputs of memory system 400 are connected to form a ring topology. This allows serial data to be passed from device to device until it reaches a destination device. This also allows any of the devices on the ring to originate data (or commands) and have it passed along by the other devices until it reaches its destination. Typically, the destination device of a command or data originated by one of memory devices 420-422 will be controller 410. Typically, commands or data originated by controller 410 will be destined for one of memory devices 420-422.

Figure 5:
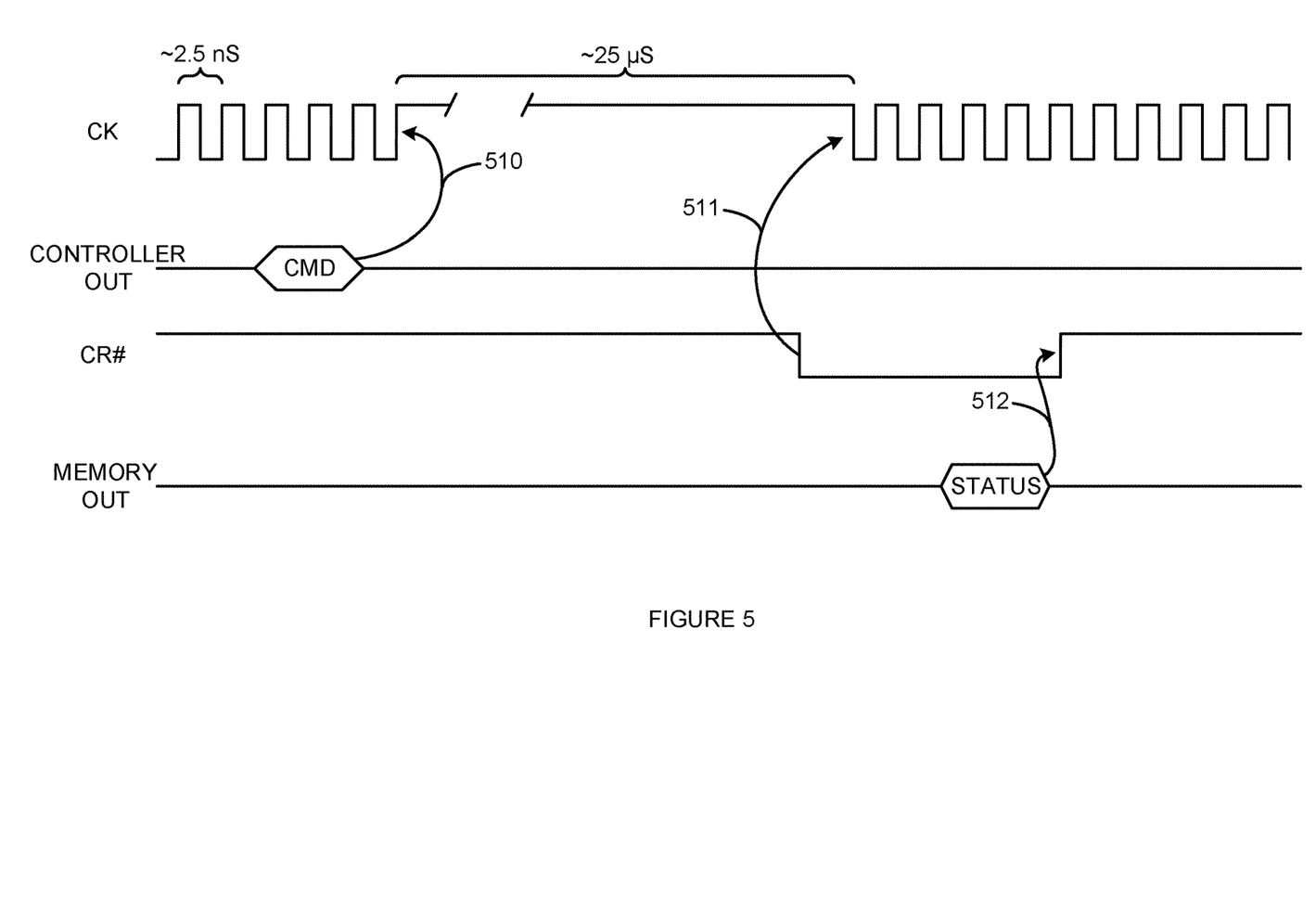
FIG. 5 is a timing diagram illustrating the operation of a memory device interface.

FIG. 5 is a timing diagram illustrating the operation of a memory device interface according to an embodiment. FIG. 5 illustrates a clock signal (CK), a controller output interface (controller out), a resume signal (CR #), and a memory output interface (memory out).

At the start of the timing diagram of FIG. 5, CK is shown toggling with a period of approximately 2.5 nS. Controller out and memory out are shown as undriven/unknown/don't care. CR # is not asserted. Later in the timing diagram, while CK is toggling, a command (CMD) is driven on controller out. For example, a command may be driven by controller 110 onto interface signal lines 153.

After the command is driven, CK stops toggling and assumes a steady state at a high logic level (510). For example, controller 110 may stop sending clock signal CK. After approximately 25 µS has elapsed (e.g., while a memory device processes the command), CR # is asserted. For example, CR # may be asserted by memory device 130. In response to the assertion of CR #, CK begins toggling again (511). For example, controller 110 may resume sending the clock signal CK. Once the clock has resumed toggling, a status is driven on memory out. For example, data or status may be driven by memory device 130 onto interface signal lines 153. After the status is finished being driven, CR # is de-asserted (512). For example, memory device 130 may de-assert the resume signal after it has driven a status (and/or data) to controller 110. Controller 110 may then be free to drive another command, or once again stop toggling the clock.

Figure 6:
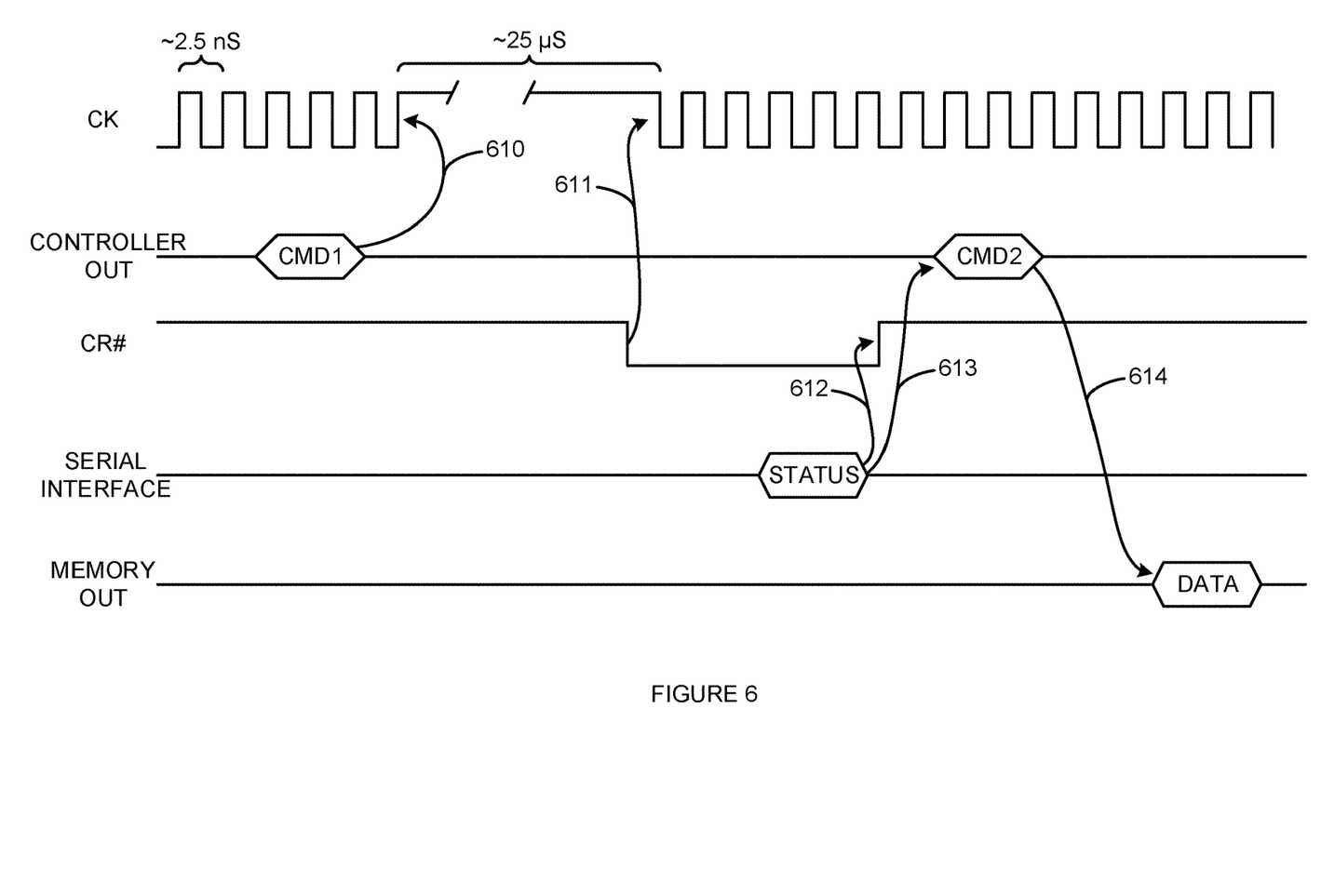
FIG. 6 is a timing diagram illustrating a read operation communicated via a memory device interface.

FIG. 6 is a timing diagram illustrating a read operation communicated via a memory device interface. FIG. 6 illustrates a clock signal (CK), a controller output interface (controller out), a resume signal (CR #), a serial interface (serial interface), and a memory output interface (memory out).

At the start of the timing diagram of FIG. 6, CK is shown toggling with a period of approximately 2.5 nS. Controller out, serial interface, and memory out are shown as undriven/unknown/don't care. CR # is not asserted. Later in the timing diagram, while CK is toggling, a first read command (CMD1) is driven on controller out. The read command, in this example, is driven by controller 210 to memory device 230.

After CMD1 is driven, CK stops toggling and assumes a steady state at a high logic level (610). For example, controller 210 may stop sending clock signal CK. After approximately 25 µS has elapsed, such as while memory device 230 processes CMD1, CR # is asserted. For example, CR # may be asserted by memory device 230 when it is done, or almost done, processing CMD1. CK begins toggling again as a result of the assertion of CR # (611). For example, as a result of CR # being asserted, controller 210 may resume sending the clock signal CK. Once the clock has resumed toggling, a status is driven on the serial interface. For example, once the clock has resumed toggling, data or status may be driven by memory device 230 on interface signal lines 254 according to timing specified by CK. After the status is finished being driven, CR # is de-asserted (612). For example, memory device 230 may de-assert the resume signal after it has driven a status (and/or data) to controller 210 via a serial interface.

In response to receiving the status via the serial interface, a second command (CMD2) is driven on controller out (613). For example, if CMD1 was a read activate command, a read column command may be issued by controller 210 to complete the transfer of data from memory device 230. After CMD2 is driven, data may be driven on memory out (614). For example, in response to the read column command, memory device 230 may send data read from memory core 236 to controller 210 via a parallel interface. Controller 210 may then be free to drive another command, or once again stop toggling the clock.

Figure 7:
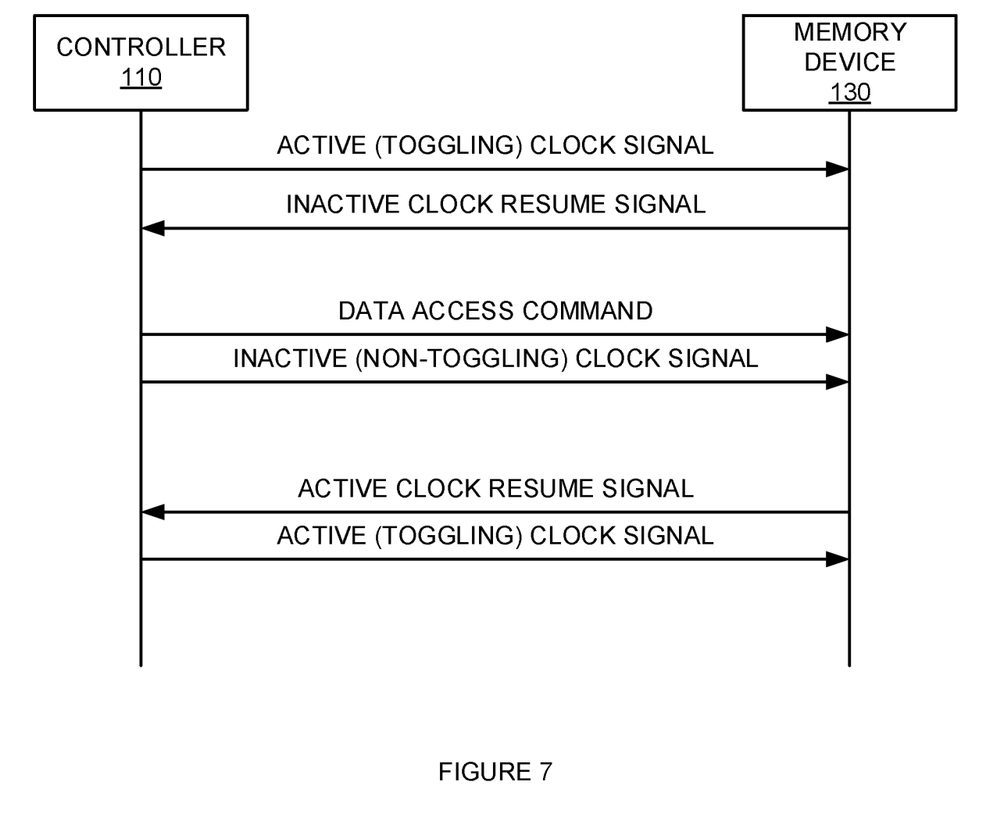
FIG. 7 is a flow diagram illustrating a method of saving power by suspending and reactivating an interface clock.

FIG. 7 is a flow diagram illustrating a method of saving power by suspending and reactivating an interface clock. An active (i.e., toggling) clock signal is sent from controller 110 to memory device 130. While the active clock signal is being sent, memory device 130 sends an inactive clock resume signal to controller 110. A data access command is then sent by controller 110 to memory device 130. For example, controller 110 may send a read or write data command to memory device 130.

After the data access command is sent, controller 110 sends an inactive (i.e., non-toggling) clock signal to memory device 130. In other words, controller 110 stops sending a clock signal to memory device 130 and holds the clock signal steady at a predetermined logic level. Holding the clock signal steady (i.e., inactive) saves at least the amount of power it would take to drive a toggling clock signal. It may also save power consumed by memory devices (e.g., 320-322) that were not the target of the data access command by not switching some of their internal circuits.

Memory device 130 then sends an active clock resume signal to controller 110. In other words, memory device 130 asserts the clock resume signal. Memory device 130 may send the active clock resume signal before or after it has completed processing the data access command. In response to receiving the active clock resume signal, controller 110 resumes sending an active clock signal to memory device 130.

Figure 8:
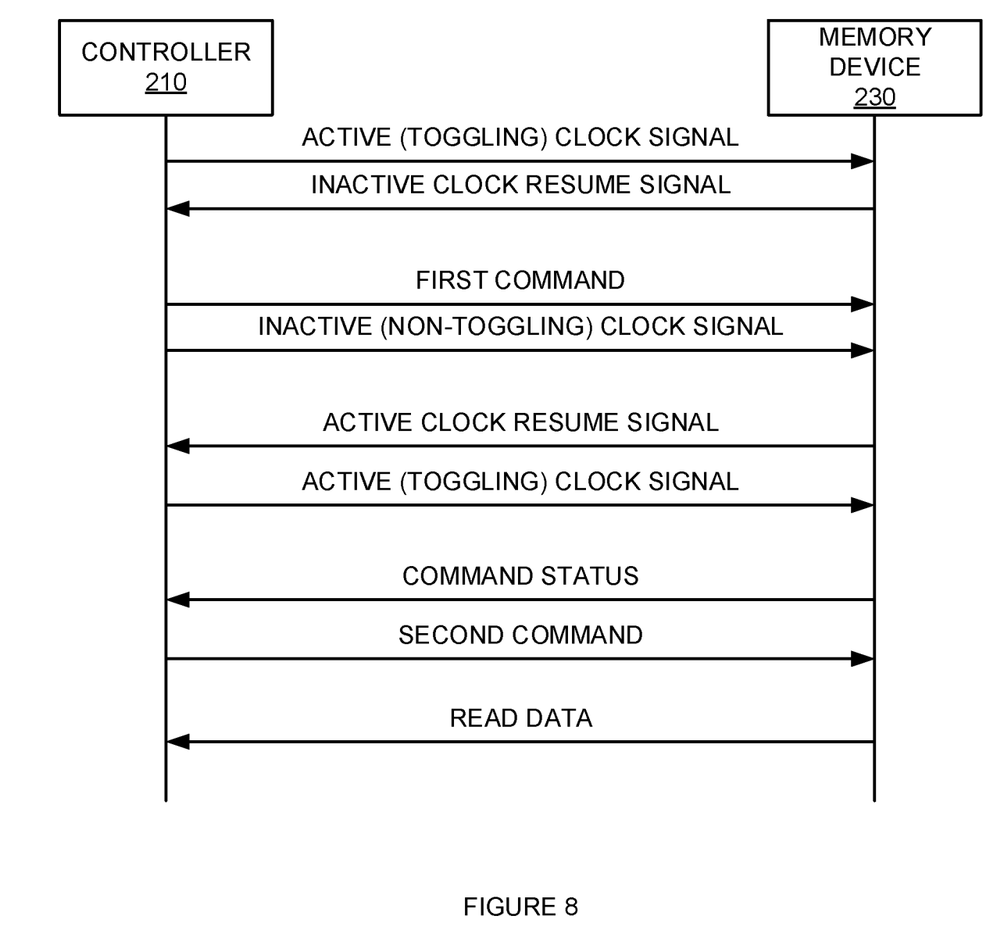
FIG. 8 is a flow diagram illustrating a method of saving power by suspending and reactivating an interface clock during a read command sequence.

FIG. 8 is a flow diagram illustrating a method of saving power by suspending and reactivating an interface clock during a read command sequence. An active clock signal is sent from controller 210 to memory device 230. Memory device 230 sends an inactive clock resume signal to controller 210. A first command is then sent by controller 210 to memory device 230. For example, controller 210 may send a read activate command to memory device 230 via interface signal lines 253.

After the first command is sent, controller 210 sends an inactive clock signal to memory device 230. Sending an inactive clock signal saves the power it would take to drive a toggling clock signal. Memory device 230 then sends an active clock resume signal to controller 210. As discussed previously, memory device 230 may send the active clock resume signal before or after it has completed processing the first command. In response to receiving the active clock resume signal, controller 210 resumes sending an active clock signal to memory device 230.

The active clock signal allows memory device 230 to send a command status (or result) back to controller 210. Memory device 230 may send the command status via a serial bus, or via a parallel bus. The timing of signals on these busses may be controlled by the active clock signal. In response to receiving the command status from memory device 230, controller 210 sends a second command. For example, controller 210 may send a read column command to memory device 230. In response to receiving the second command, memory device 230 sends read data to controller 210. Memory device 230 may send the read data via a parallel interface.

Figure 9:
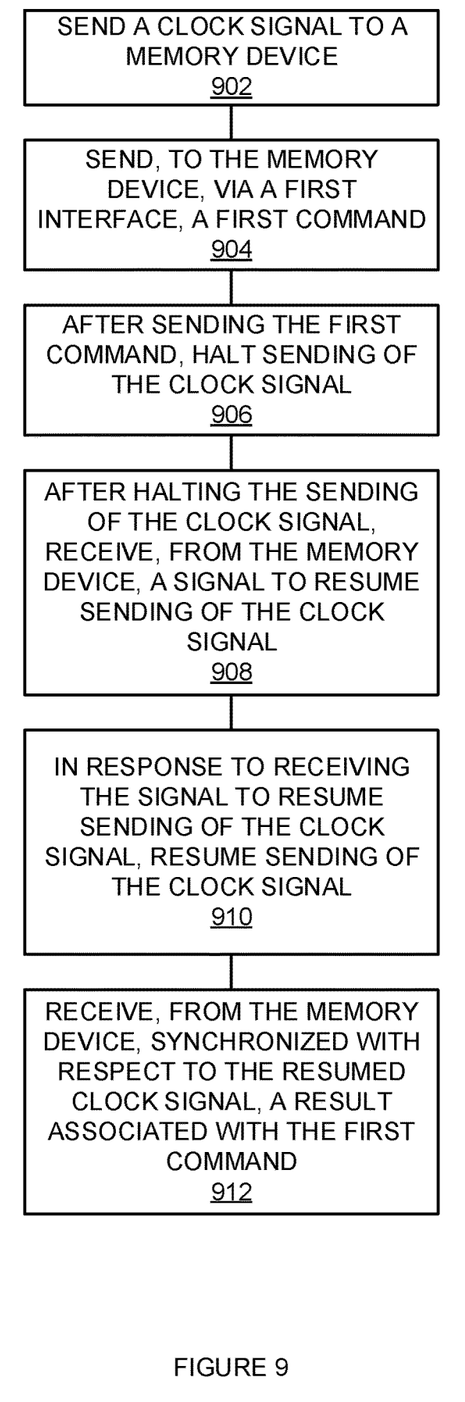
FIG. 9 is a flowchart illustrating a method of operating a memory device interface to save power.

FIG. 9 is a flowchart illustrating a method of operating a memory device interface to save power. The steps illustrated in FIG. 9 may be performed by one or more elements of memory system 100, memory system 200, memory system 300, or memory system 400.

A clock signal is sent to a memory device (902). For example, controller 410 may send a clock signal to memory device 420 via clock signal line 431. A first command is sent, via a first interface, to the memory device (904). For example, controller 410 may send a read activate command to memory device 420 via address/command/data bus 430. Sending of the clock signal is halted after sending the first command (906). For example, controller 410 may stop sending a clock signal on clock signal line 431. After halting the sending of the clock signal, a signal is received, from the memory device, to resume sending of the clock signal (908). For example, controller 410 may receive, via resume signal line 432, a signal to resume sending a clock signal via clock signal line 431.

In response to receiving the signal to resume sending the clock signal, the sending of the clock signal is resumed (910). For example, controller 410 may resume driving a clock signal on clock signal line 431 after receiving a clock resume signal on resume signal line 432. A result associated with the first command is received, synchronized with respect to the resumed clock signal, from the memory device (912). For example, a result associated with the read activate command may be received by controller 410 via serial interface line 443. The serial bits associated with this command may be sent and received with timing determined by the resumed clock signal sent on clock signal line 431. In another example, a result associated with the read activate command may be received by controller 410 via address/command/data bus 430 synchronized with respect to the clock signal.

The methods, systems and devices described above may be implemented in computer systems, or stored by computer systems. The methods described above may also be stored on a computer readable medium. Devices, circuits, and systems described herein may be implemented using computer-aided design tools available in the art, and embodied by computer-readable files containing software descriptions of such circuits. This includes, but is not limited to memory systems 100, 200, 300, and 400 and their components. These software descriptions may be: behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
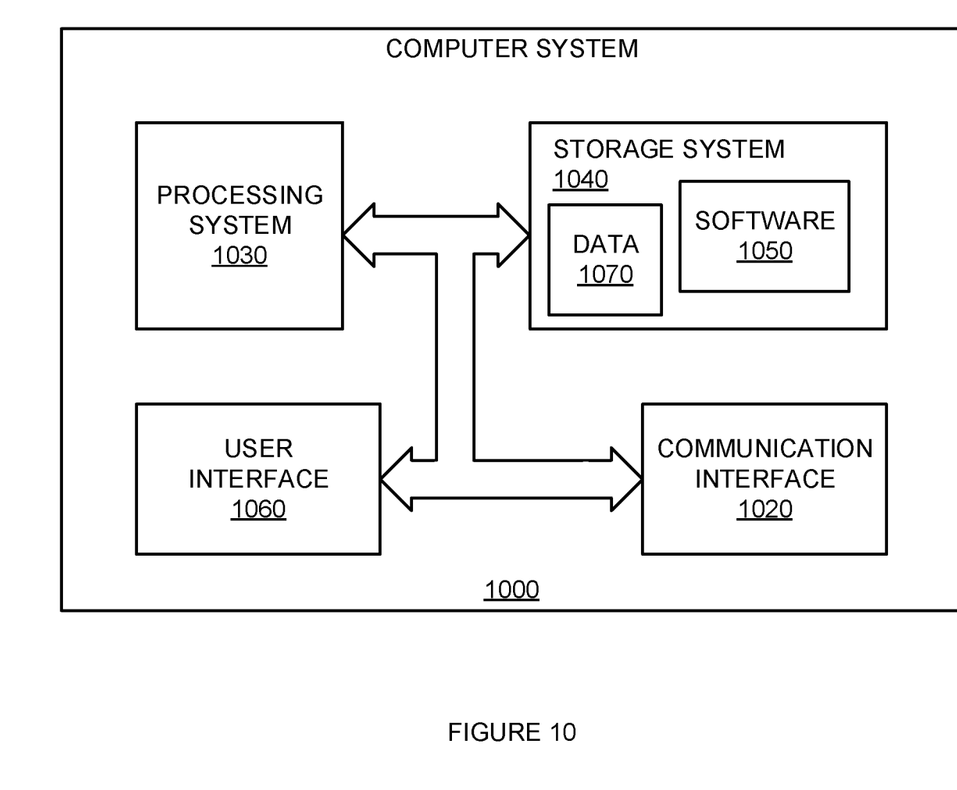
FIG. 10 illustrates a block diagram of a computer system.

FIG. 10 illustrates a block diagram of a computer system. Computer system 1000 includes communication interface 1020, processing system 1030, storage system 1040, and user interface 1060. Processing system 1030 is operatively coupled to storage system 1040. Storage system 1040 stores software 1050 and data 1070. Storage system 1040 may include one or more of memory systems 100, 200, 300, or 400. Processing system 1030 is operatively coupled to communication interface 1020 and user interface 1060. Computer system 1000 may comprise a programmed general-purpose computer. Computer system 1000 may include a microprocessor. Computer system 1000 may comprise programmable or special purpose circuitry. Computer system 1000 may be distributed among multiple devices, processors, storage, and/or interfaces that together comprise elements 1020-1070.

Communication interface 1020 may comprise a network interface, modem, port, bus, link, transceiver, or other communication device. Communication interface 1020 may be distributed among multiple communication devices. Processing system 1030 may comprise a microprocessor, microcontroller, logic circuit, or other processing device. Processing system 1030 may be distributed among multiple processing devices. User interface 1060 may comprise a keyboard, mouse, voice recognition interface, microphone and speakers, graphical display, touch screen, or other type of user interface device. User interface 1060 may be distributed among multiple interface devices. Storage system 1040 may comprise a disk, tape, integrated circuit, RAM, ROM, EEPROM, flash memory, network storage, server, or other memory function. Storage system 1040 may include computer readable medium. Storage system 1040 may be distributed among multiple memory devices.

Processing system 1030 retrieves and executes software 1050 from storage system 1040. Processing system may retrieve and store data 1070. Processing system may also retrieve and store data via communication interface 1020. Processing system 1050 may create or modify software 1050 or data 1070 to achieve a tangible result. Processing system may control communication interface 1020 or user interface 1070 to achieve a tangible result. Processing system may retrieve and execute remotely stored software via communication interface 1020.

Software 1050 and remotely stored software may comprise an operating system, utilities, drivers, networking software, and other software typically executed by a computer system. Software 1050 may comprise an application program, applet, firmware, or other form of machine-readable processing instructions typically executed by a computer system. When executed by processing system 1030, software 1050 or remotely stored software may direct computer system 1000 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A controller, comprising:
   a first driver circuit to selectively transmit a clock signal to a plurality of memory devices;
   an interface to transmit a command to the plurality of memory devices, timed by the clock signal, that specifies an access of data; and,
   a first receiver circuit to receive, collectively from the plurality of memory devices, a first indicator indicating the plurality of memory devices are collectively ready to not receive the clock signal, the first receiver circuit to receive, from at least a first memory device of the plurality of memory devices, a second indicator indicating the first memory device is ready to receive the clock signal to time a data transfer.

2. The controller of claim 1, further comprising:
   a second driver circuit to transmit a timing signal, the timing signal to be used by the first memory device to sample the data transfer.

3. The controller of claim 1, further comprising a plurality of receivers to receive the data transfer during transmission of the clock signal.

4. The controller of claim 3, wherein the plurality of receivers sample the data synchronously with respect to the clock signal.

5. The controller of claim 1, further comprising a second receiver circuit to receive status information.

6. The controller of claim 5, wherein the first driver circuit stops transmission of the clock signal based on the status information.

7. The controller of claim 6, wherein the status information is received serially.

8. A controller, comprising:
   a first driver circuit to selectively transmit a clock signal to a plurality of memory devices;
   an interface to transmit a command to the plurality of memory devices timed by the clock signal;
   a first receiver circuit to receive, collectively from the plurality of memory devices, a first indicator indicating the plurality of memory devices are collectively ready to not receive the clock signal, the first receiver circuit to receive, from at least a first memory device of the plurality of memory devices a second indicator indicating the first memory device is ready to receive the clock signal to time a data transfer; and, a plurality of receivers to receive a data transfer based on the clock signal.

9. The controller of claim 8, further comprising:
a second driver circuit to transmit a timing signal, the clock signal to be used by the first memory device to sample the data transfer.

10. The controller of claim 9, wherein the data transfer timing is further based on the timing signal.

11. The controller of claim 8, wherein the plurality of receivers sample the data synchronously with respect to the clock signal.

12. The controller of claim 8, further comprising a second receiver circuit to receive status information.

13. The controller of claim 12, wherein the second driver circuit stops transmission of the clock signal based on the status information.

14. The controller of claim 13, wherein the status information is received serially.

15. A first memory device, comprising:
a first receiver circuit to receive a selectively transmitted clock signal;
an interface to receive a command, from a controller and timed by the clock signal, that specifies an access of data; and,
a first driver circuit to, collectively with a second memory device, transmit a first indicator to a controller, the first indicator indicating to the controller that the first memory device and the second memory device are collectively ready to not receive the clock signal, the first driver circuit to transmit a second indicator indicating to the controller that at least the first memory device is ready to receive the clock signal to time a data transfer.

16. The first memory device of claim 15, further comprising:
a second receiver circuit to receive a timing signal, the timing signal to be used by the first memory device to sample the data transfer.

17. The first memory device of claim 15, further comprising a plurality of drivers to transmit the data transfer during transmission of the clock signal.

18. The first memory device of claim 17, wherein the plurality of drivers transmit the data transfer synchronously with respect to the clock signal.

19. The first memory device of claim 15, further comprising a second driver circuit to transmit status information.

20. The first memory device of claim 19, wherein the controller stops transmission of the clock signal based on the status information.

* * * * *